(12) United States Patent
Ruvang

(10) Patent No.: US 9,409,258 B2
(45) Date of Patent: Aug. 9, 2016

(54) WEAR MEMBER STABILIZATION ON EXCAVATOR LIP

(71) Applicant: BLACK CAT BLADES LTD., Edmonton (CA)

(72) Inventor: John A. Ruvang, Bartonville, TX (US)

(73) Assignee: Black Cat Blades, Ltd., Edmonton, Alberta (CA)

( * ) Notice: Subject to any disclaimer, the term of this patent is extended or adjusted under 35 U.S.C. 154(b) by 45 days.

(21) Appl. No.: 14/534,018

(22) Filed: Nov. 5, 2014

(65) Prior Publication Data

US 2015/0167277 A1    Jun. 18, 2015

(30) Foreign Application Priority Data

Dec. 18, 2013    (WO) ............... PCT/IB2013/003197

(51) Int. Cl.
  *E02F 9/28* (2006.01)
  *B23K 31/02* (2006.01)
  *E21C 35/19* (2006.01)

(52) U.S. Cl.
  CPC ............ *B23K 31/02* (2013.01); *E02F 9/2825* (2013.01); *E02F 9/2858* (2013.01); *E02F 9/2883* (2013.01); *E21C 35/19* (2013.01)

(58) Field of Classification Search
  CPC ...... A01B 15/02; E02F 9/2833; E02F 9/2883; E02F 9/2825; E02F 9/2816; E02C 35/19; B23K 31/02
  USPC ............................ 37/446, 450–456; 172/719
  See application file for complete search history.

(56) References Cited

U.S. PATENT DOCUMENTS

| | | | | |
|---|---|---|---|---|
| 3,496,658 A | * | 2/1970 | Eyolfson | E02F 9/28 37/455 |
| 5,144,762 A | * | 9/1992 | Robinson | E02F 9/2816 37/453 |
| 5,553,409 A | | 9/1996 | Irving | |
| 5,713,145 A | * | 2/1998 | Ruvang | E02F 9/2833 37/455 |
| 5,937,549 A | * | 8/1999 | Bender | E02F 9/2825 172/772 |
| 6,209,238 B1 | | 4/2001 | Ruvang | |
| 6,986,216 B2 | | 1/2006 | Emrich et al. | |
| 7,596,895 B2 | * | 10/2009 | Jones | E02F 9/28 37/452 |
| 7,690,136 B2 | * | 4/2010 | Breken | E02F 9/2858 37/452 |
| 7,980,011 B2 | | 7/2011 | Ruvang | |
| 8,261,472 B2 | | 9/2012 | Ruvang | |
| 8,302,333 B2 | | 11/2012 | Ruvang | |
| 8,819,967 B2 | * | 9/2014 | Campomanes | E02F 9/2825 37/450 |
| 2013/0247427 A1 | | 9/2013 | Campomanes | |

OTHER PUBLICATIONS

International Search Report with Written Opinion issued Aug. 14, 2014 for PCT Patent Application No. PCT/IB2013/003197, 10 pages.

* cited by examiner

*Primary Examiner* — Robert Pezzuto
(74) *Attorney, Agent, or Firm* — Smith IP Services, P.C.

(57) ABSTRACT

A wear member stabilization system can include a wear member having recesses formed therein on opposing sides of an excavator lip receiving slot, the recesses receiving therein respective stabilization abutments which protrude outwardly from respective opposing inner and outer sides of the lip. A method of stabilizing a wear member on an excavator lip can include welding stabilization abutments to respective inner and outer sides of the lip, sliding the wear member onto the excavator lip, thereby engaging the stabilization abutments with respective recesses formed in the wear member, the stabilization abutments contacting lateral sides of the recesses between a forward end of the excavator lip and an opening extending through the excavator lip, thereby limiting lateral movement of the wear member relative to the excavator lip.

22 Claims, 10 Drawing Sheets

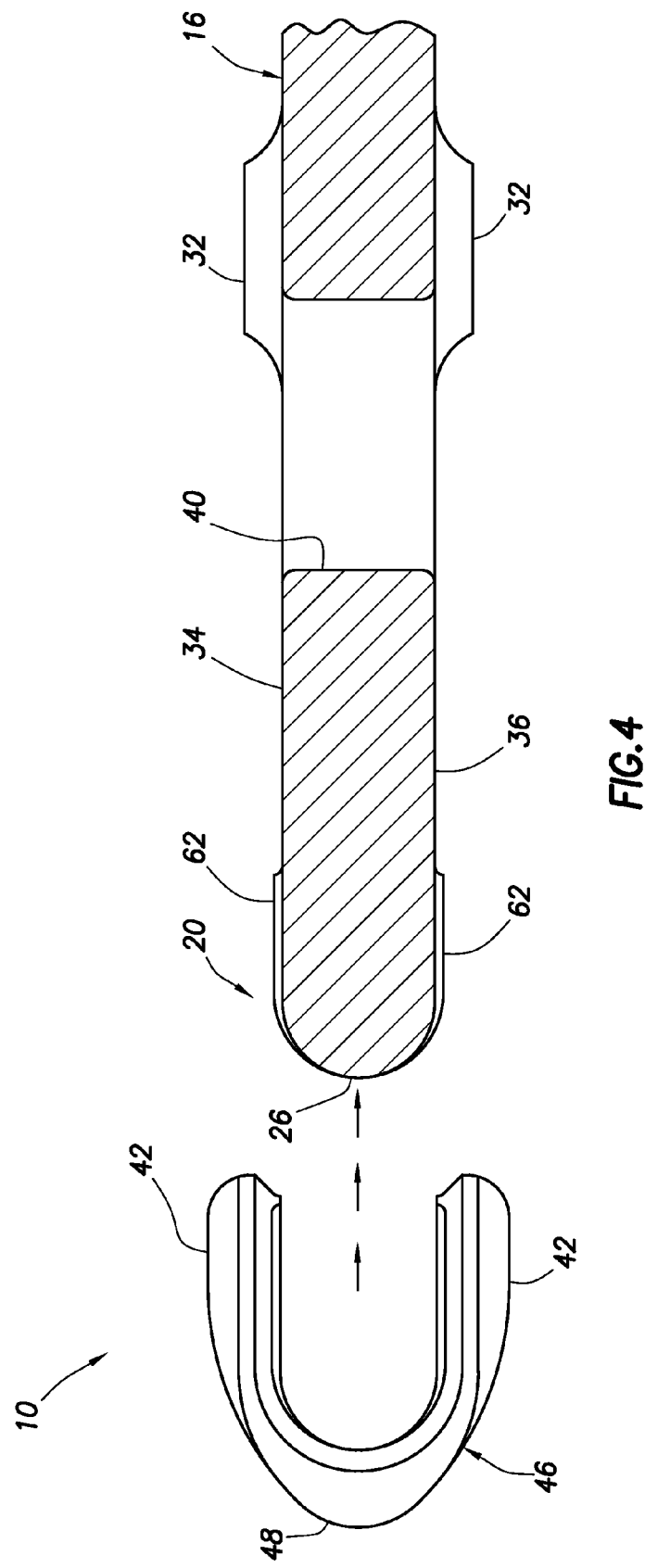

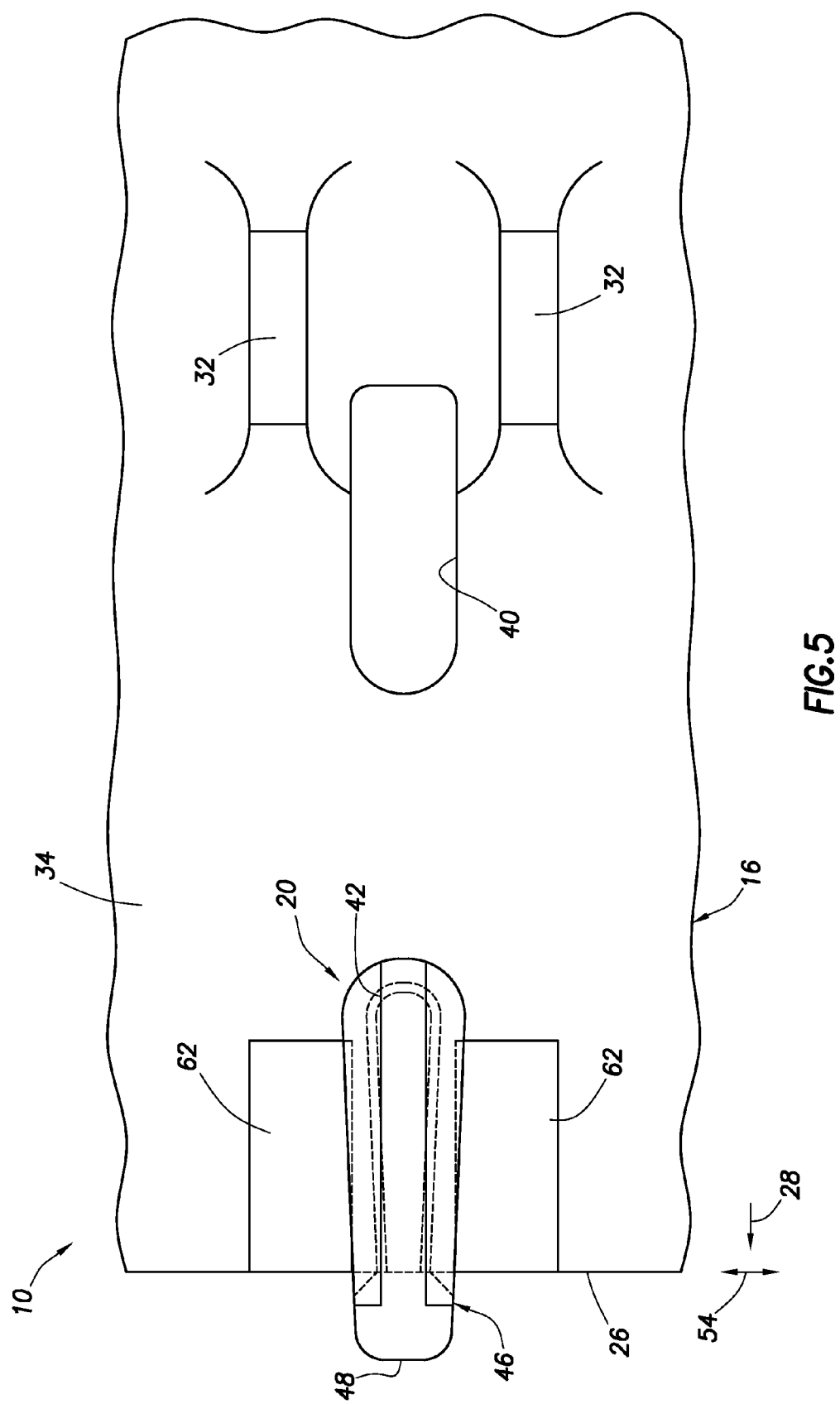

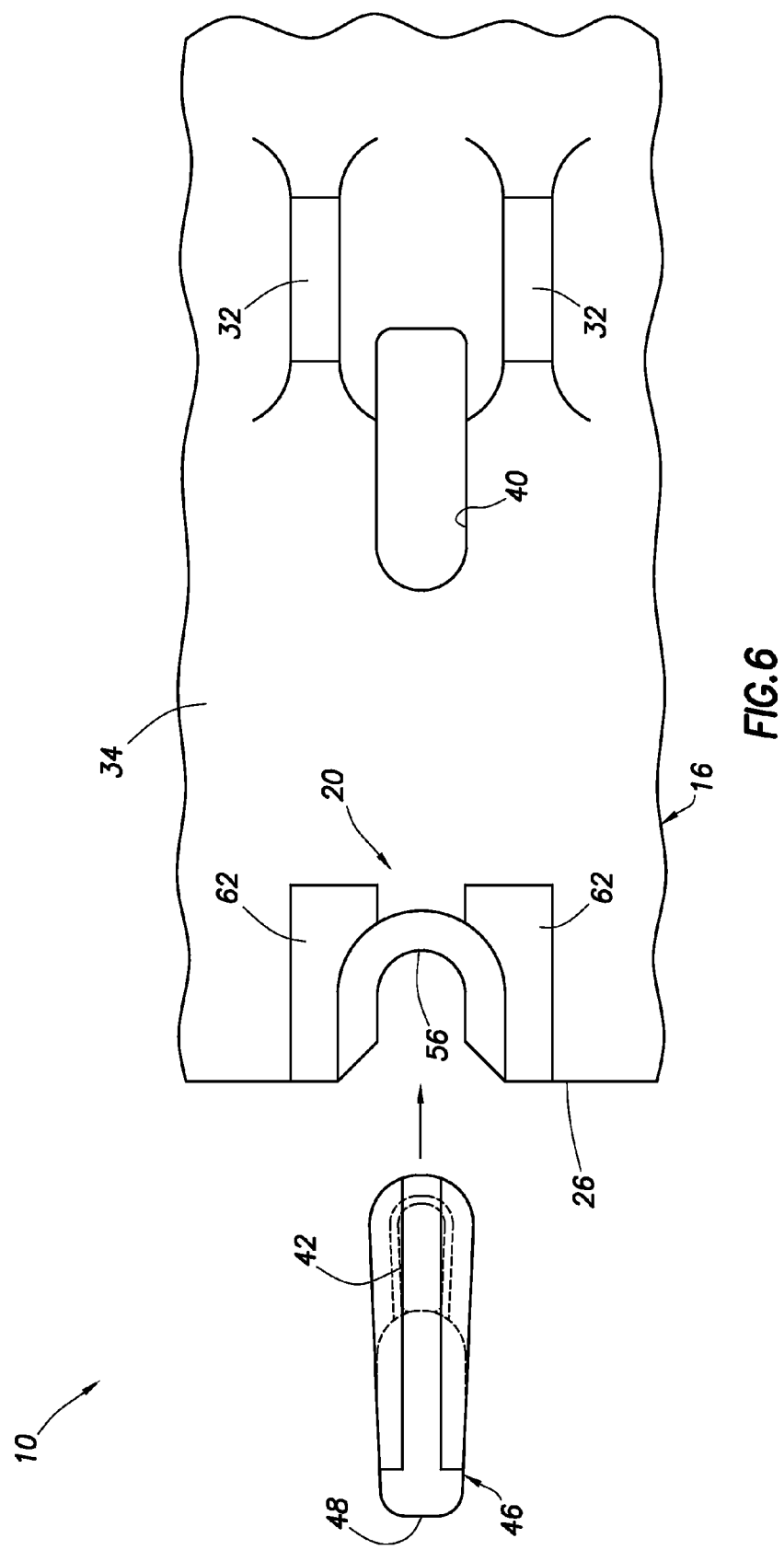

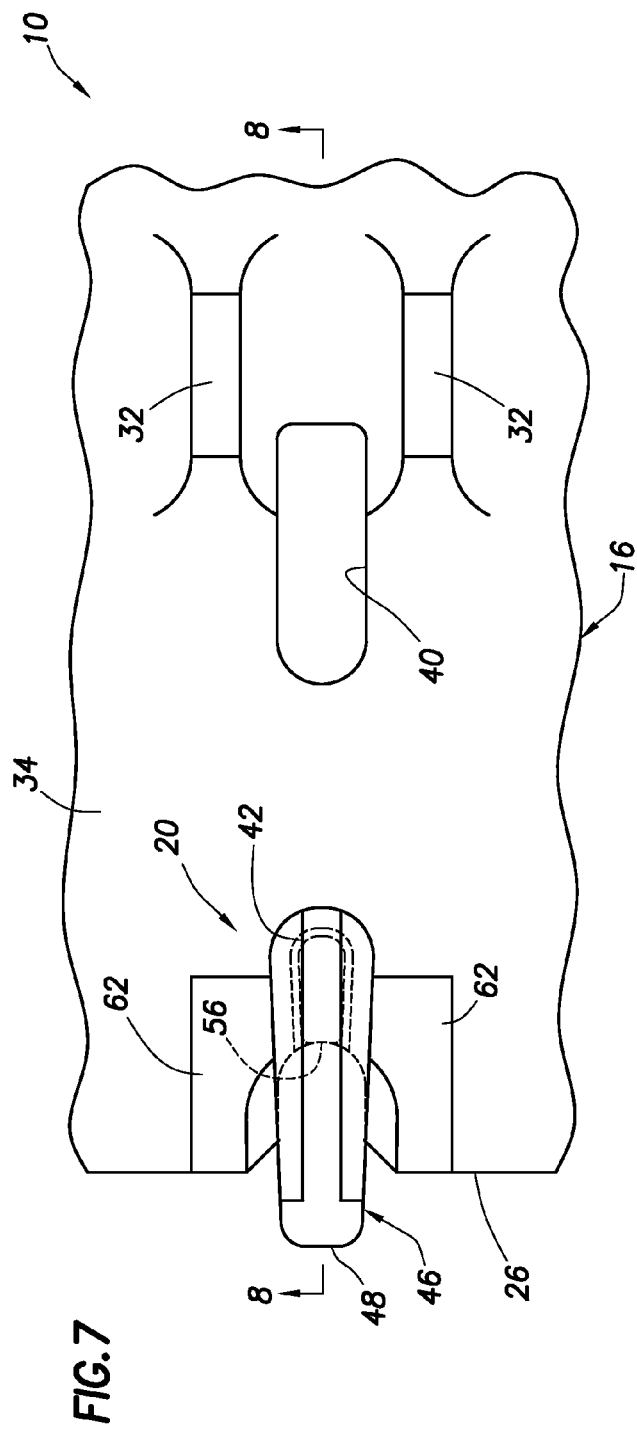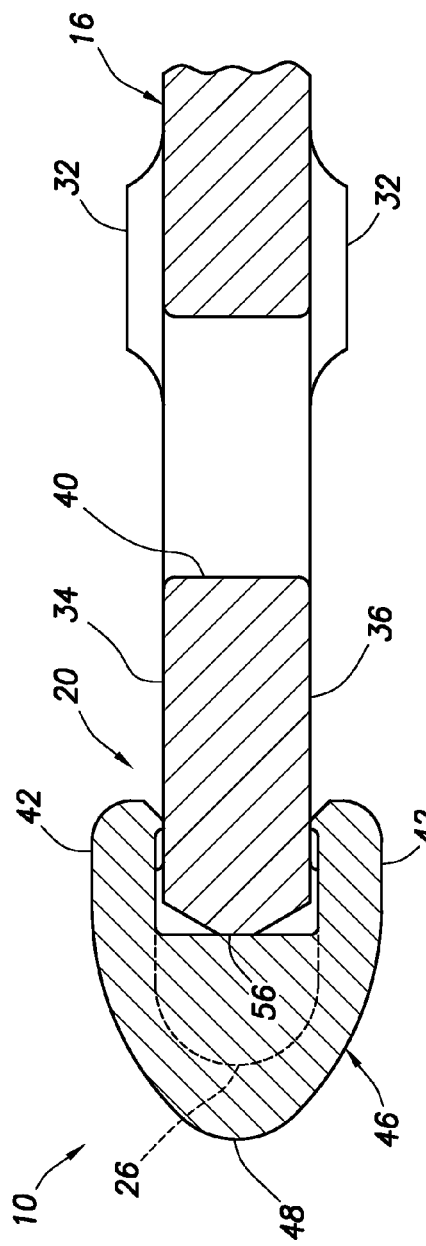

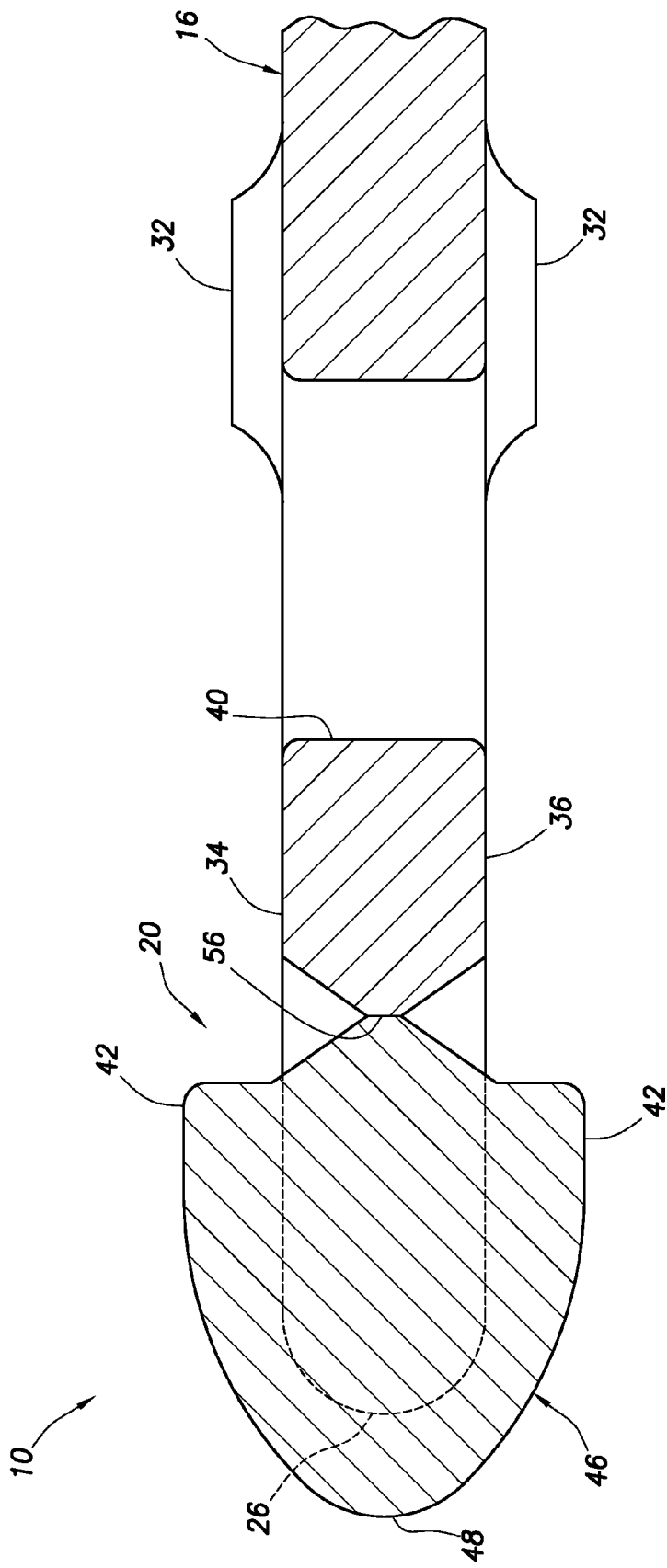

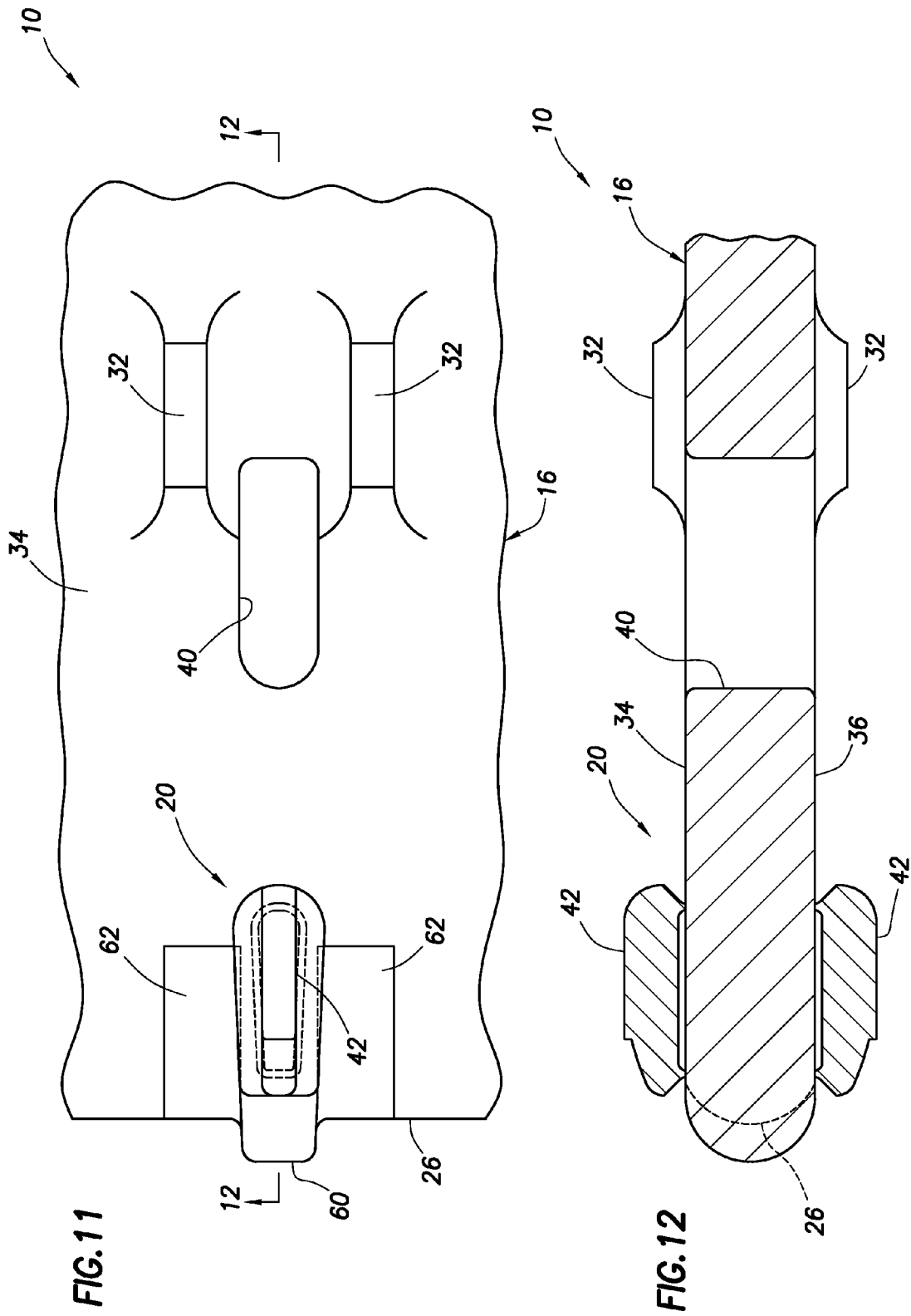

WEAR MEMBER STABILIZATION ON EXCAVATOR LIP

CROSS-REFERENCE TO RELATED APPLICATION

This application claims the benefit under 35 USC §119 of the filing date of International Application Serial No. PCT/IB2013/003197 filed 18 Dec. 2013. The entire disclosure of this prior application is incorporated herein by this reference.

BACKGROUND

This disclosure relates generally to equipment utilized and operations performed for excavating machinery and, in one example described below, more particularly provides for wear member stabilization on an excavator lip.

A lip of an excavation implement can become worn or otherwise damaged due to engagement with materials being excavated. To mitigate such damage, an excavator lip can be provided with replaceable wear members, such as teeth, adaptors and shrouds. Therefore, it will be appreciated that improvements are continually needed in the arts of constructing and utilizing excavator lips with wear members.

BRIEF DESCRIPTION OF THE DRAWINGS

FIGS. 4 & 5 are representative partially cross-sectional and plan views, respectively, of the lip and wear member.

FIGS. 6-8 are representative exploded plan, plan and cross-sectional views, respectively, of another example of the lip and wear member.

FIGS. 9 & 10 are exploded plan and cross-sectional views, respectively, of another example of the lip and wear member.

FIGS. 11 & 12 are plan and cross-sectional views, respectively, of yet another example of the lip and wear member.

DETAILED DESCRIPTION

Figure 1:
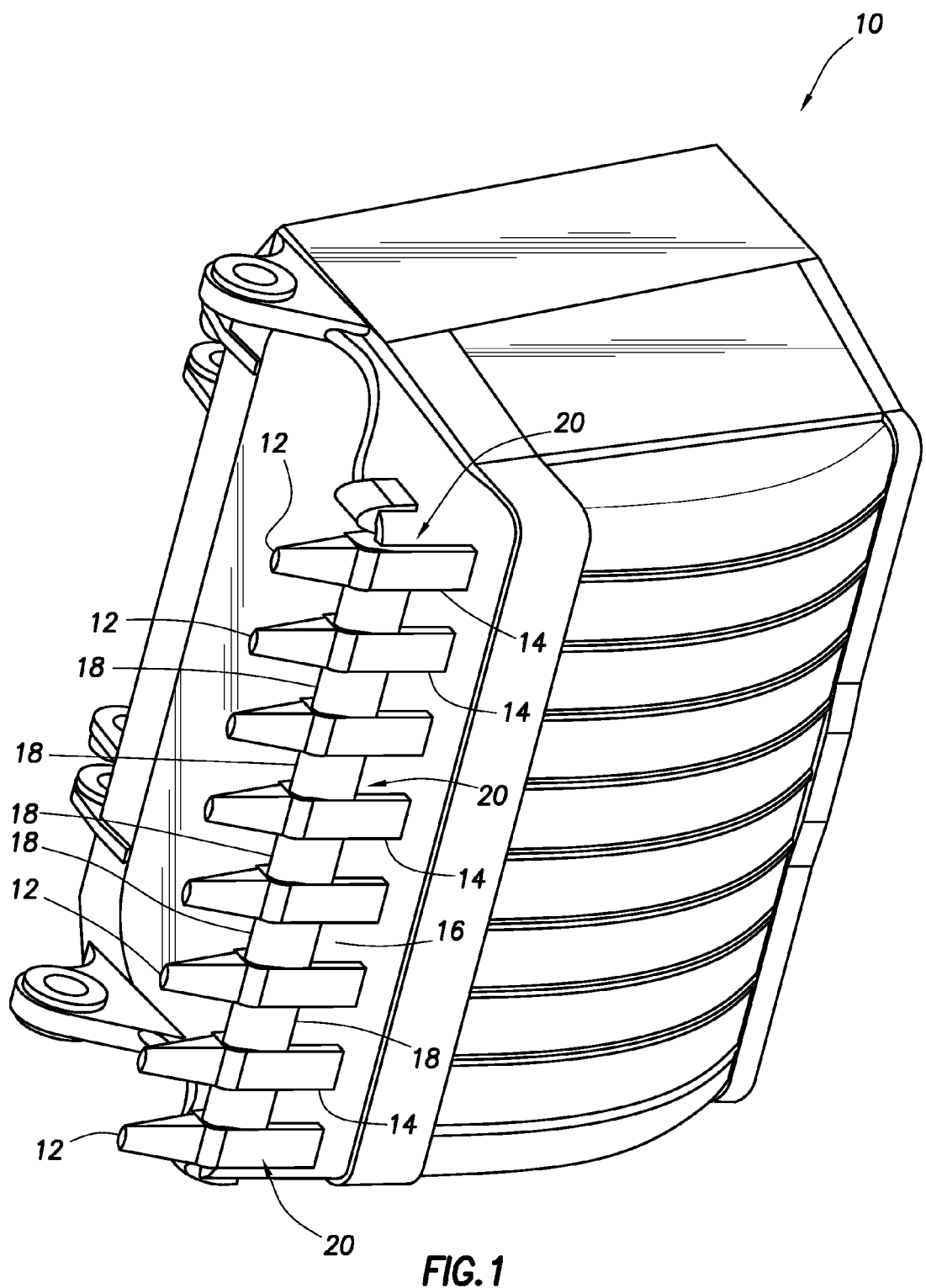
FIG. 1 is a representative perspective view of an excavation implement which can embody principles of this disclosure.

Representatively illustrated in FIG. 1 is an excavation implement 10 and associated method which can embody principles of this disclosure. However, it should be clearly understood that the implement 10 and method are merely one example of an application of the principles of this disclosure in practice, and a wide variety of other examples are possible. Therefore, the scope of this disclosure is not limited at all to the details of the implement 10 and method described herein and/or depicted in the drawings.

In the example of FIG. 1, the implement 10 is of the type known as a "dipper" or "bucket" of a cable shovel, but it should be clearly understood that the principles of this disclosure can be utilized with other types of excavation implements. Indeed, the principles of this disclosure could be used to improve the attachment of wear members to any type of excavation implements.

In the illustration of FIG. 1, the implement 10 is rotated so that an earth-engaging side of the implement is clearly visible. From this perspective, it may be seen that multiple teeth 12 are mounted on the implement 10 for piercing the earth.

These teeth 12 are typically rapidly worn down or otherwise damaged during use of the implement 10, and so replacement of the teeth should be conveniently, economically, rapidly and safely accomplished. These objectives are obtained by use of specially configured adapters 14 which releasably secure the teeth 12 to a forward edge of a lip 16 of the implement 10.

The adaptors 14 are examples of wear members that protect the earth-engaging lip 16 of the implement 10. Other examples of wear members include shrouds 18, which wrap around the forward edge of the lip 16 between the adaptors 14. In yet another example, the teeth 12 can be attached to the lip 16, without use of the separate adaptors 14, in which case the teeth can themselves serve as wear members for protection of the lip. Any type of wear member can be used, in keeping with the scope of this disclosure.

When the wear members (e.g., teeth 12, adaptors 14, shrouds 18) engage the earth or other material during excavation, side loads can be imparted to the wear members, causing the wear members to move somewhat relative to the lip 16. Over time, and with repeated imparting of side loads to the wear members, wear and other damage can result to the wear members and/or the lip 16.

Conventional wear member attachment systems (such as, the Wisler-type attachment system well known to those skilled in the art) can include a protrusion that extends forwardly from a forward edge of an excavator lip. When a wear member is attached to the lip, the protrusion is somewhat loosely received in a complementarily shaped pocket formed in the wear member. However, this engagement between the protrusion and the pocket in the wear member only prevents large lateral movements of the wear member relative to the forward edge of the lip. Smaller relative movements are still permitted, which lead to the wear and other damage mentioned above.

In contrast, the excavation implement 10 of FIG. 1 is provided with a wear member stabilization system 20 (not completely visible in FIG. 1, see FIG. 2) that substantially prevents lateral movement of the wear members 12, 14, 18 relative to a forward end of the lip 16, thereby mitigating wear and other damage due to lateral forces imparted to the wear members.

Figure 2:
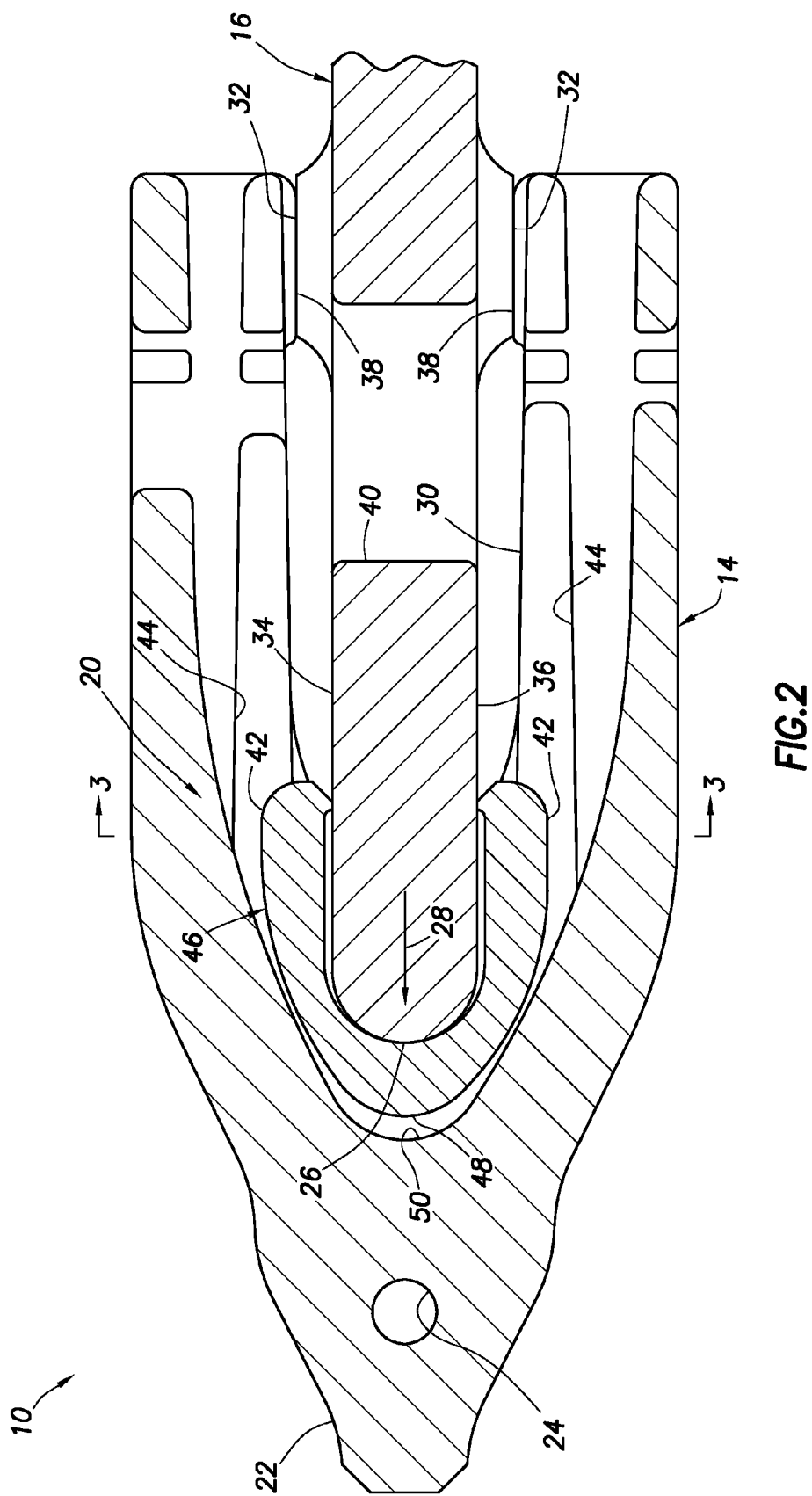
FIG. 2 is a representative cross-sectional view of a wear member mounted on a lip of the implement, the lip and wear member embodying the principles of this disclosure.

Referring additionally now to FIG. 2, a cross-sectional view of one stabilization system 20 of the excavation implement 10 is representatively illustrated. Preferably, each wear member attached to the lip 16 of the implement 10 is laterally stabilized with a respective one of the stabilization system 20, but such is not necessary in keeping with the scope of this disclosure.

For example, teeth 12 and/or adaptors 14 might be provided with the stabilization system 20, but not the shrouds 18. Thus, the scope of this disclosure is not limited to use of the stabilization system 20 with any particular wear members or combination of wear members.

In the FIG. 2 example, an adaptor 14 is laterally stabilized using the stabilization system 20. The adaptor 14 includes certain features (such as, a nose 22 and a fastener receiving lateral opening 24) for mounting a tooth 12 thereon. However, in other examples, the tooth 12 could be mounted directly on the lip 16 (i.e., without use of the adaptor 14) and laterally stabilized using the system 20.

The lip 16 has a forward end 26. As used herein, the term "forward" is used to indicate a direction toward engagement with the earth or other material during excavating use of the implement 10 (to the left as viewed in FIG. 2). In FIG. 2, the forward direction is depicted by an arrow 28.

The forward end 26 of the lip 16 is received in a longitudinally extending slot 30 formed in the adaptor 14. When the adaptor 14 is installed on the lip 16, the adaptor is slid onto the lip and displaced rearward (to the right as viewed in FIG. 2), until the forward end 26 of the lip can be received no further into the slot 30. At that point, pads 32 formed on inner and outer sides 34, 36 of the lip 16 support opposing surfaces 38 extending inwardly from the slot 30.

An opening 40 is formed through the lip 16 between the inner and outer sides 34, 36. The opening 40 is spaced apart from the forward end 26 and is configured to receive a fastening system (not shown) therein. For example, a suitable fastening system is described in U.S. Pat. No. 8,302,333, the entire disclosure of which is incorporated herein. Another fastening system is described in U.S. Pat. No. 6,986,216.

To provide lateral stabilization of the adaptor 14 (or other wear member) on the lip 16, stabilization abutments 42 are secured to the respective inner and outer sides 34, 36 of the lip. The abutments 42 are slidingly received in longitudinal recesses 44 formed in the adaptor 14.

As used herein, the term "lateral" is used to indicate a side-to-side direction orthogonal to the forward direction 28, and parallel to the forward end 26 of the lip 16. Thus, the lateral direction extends inwardly and outwardly relative to a cross-sectional plane depicted in FIG. 2.

In the FIG. 2 example, the abutments 42 extend longitudinally along the inner and outer sides 34, 36 of the lip 16 and extend rearward from the forward end 26. The abutments 42 in this example are portions of a stabilization member 46 that wraps about the forward end 26 of the lip 16. Preferably, the stabilization member 46 is welded to the lip 16, although other attachment techniques may be used in keeping with the scope of this disclosure.

The stabilization member 46 can also include a projection 48 extending outwardly from the forward end 26 of the lip 16. The projection 48 in the FIG. 2 example is received in a space 50 formed in the adaptor 14 at a forward end of the excavator lip receiving slot 30. Such engagement between the projection 48 and the space 50 can further enhance lateral stabilization of the adaptor 14 on the lip 16 by limiting lateral movement of the adaptor relative to the lip.

Figure 3:
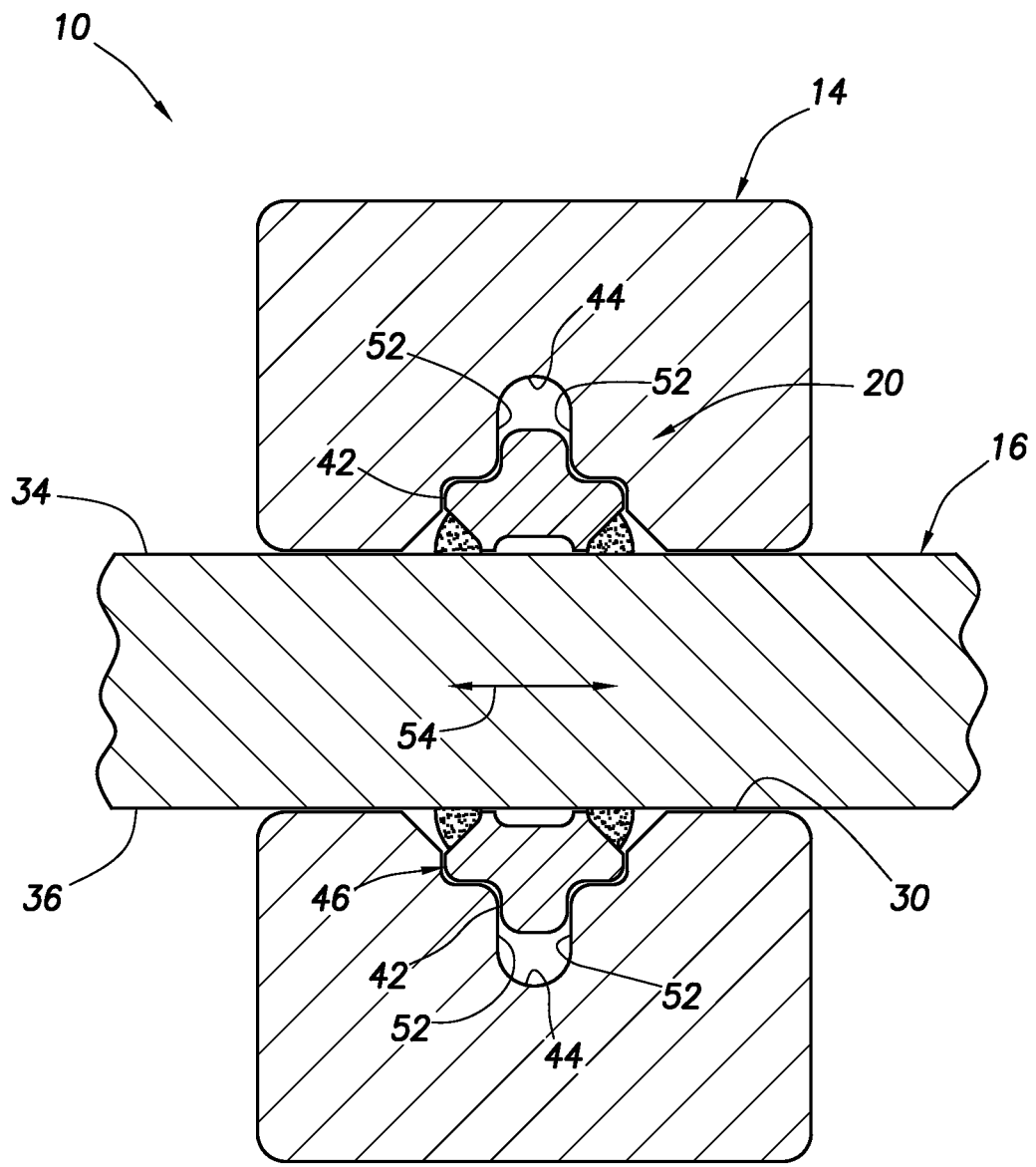
FIG. 3 is a representative cross-sectional view of the lip and wear member of FIG. 2.

Referring additionally now to FIG. 3, a cross-sectional view of the stabilization system 20 is representatively illustrated, taken along line 3-3 of FIG. 2. In this view, the manner in which the stabilization abutments 42 engage opposing lateral sides 52 of the recesses 44 to thereby limit lateral movement of the adaptor 14 relative to the lip 16 can be clearly seen. Note that the lateral direction is indicated in FIG. 3 with an arrow 54.

In this example, the abutments 42 engage the recess sides 52 at multiple levels, so that the abutments and the recesses 44 are generally "T" shaped. However, it should be clearly understood that the recess sides 52 and the abutments 42 can have any shapes, and can engage each other on any number (including one) of different levels, in keeping with the scope of this disclosure.

Referring additionally now to FIG. 4, a cross-sectional view of a manner in which the stabilization member 46 can be attached to the forward end 26 of the lip 16 is representatively illustrated. In this example, the stabilization abutments 42 are formed as bifurcated legs of the stabilization member 46, and the forward end 26 of the lip 16 is received between those legs.

Referring additionally now to FIG. 5, a plan view of the stabilization system 20 is representatively illustrated. In this view, the stabilization member 46 has been installed on the forward end 26 of the lip 16, but has not yet been welded to the inner and outer sides 34, 36 of the lip. Since, in this example, the stabilization member 46 wraps about the forward end 26 of the lip 16, the stabilization member can also be welded to the forward end of the lip.

Note that the stabilization member 46 is positioned laterally between pads 62 extending outwardly from the inner and outer sides 34, 36 of the lip 16 at the forward end 26. The pads 62 can closely engage corresponding surfaces of the slot 30 to limit movement of the adaptor 14 orthogonal to the longitudinal and lateral directions.

Referring additionally now to FIGS. 6-8, another example of the stabilization system 20 is representatively illustrated. In this example, a portion of the forward end 26 is removed prior to attachment of the stabilization member 46 to the lip 16, leaving a generally "C" shaped depression 56. The stabilization member 46 is complementarily shaped relative to the depression 56.

In FIG. 6, a plan view of the system 20 is depicted with the stabilization member 46 being installed onto the forward end 26 of the lip 16. In FIG. 7, a plan view of the system 20 is depicted with the stabilization member 46 installed into the depression 56.

In FIG. 8, a cross-sectional view of the system 20 is representatively illustrated, taken along line 8-8 of FIG. 7. In the FIG. 8 position, the stabilization member 46 is ready to be welded to the inner and outer sides 34, 36 of the lip 16, and about the depression 56 at the forward end 26 of the lip.

Figure 9:
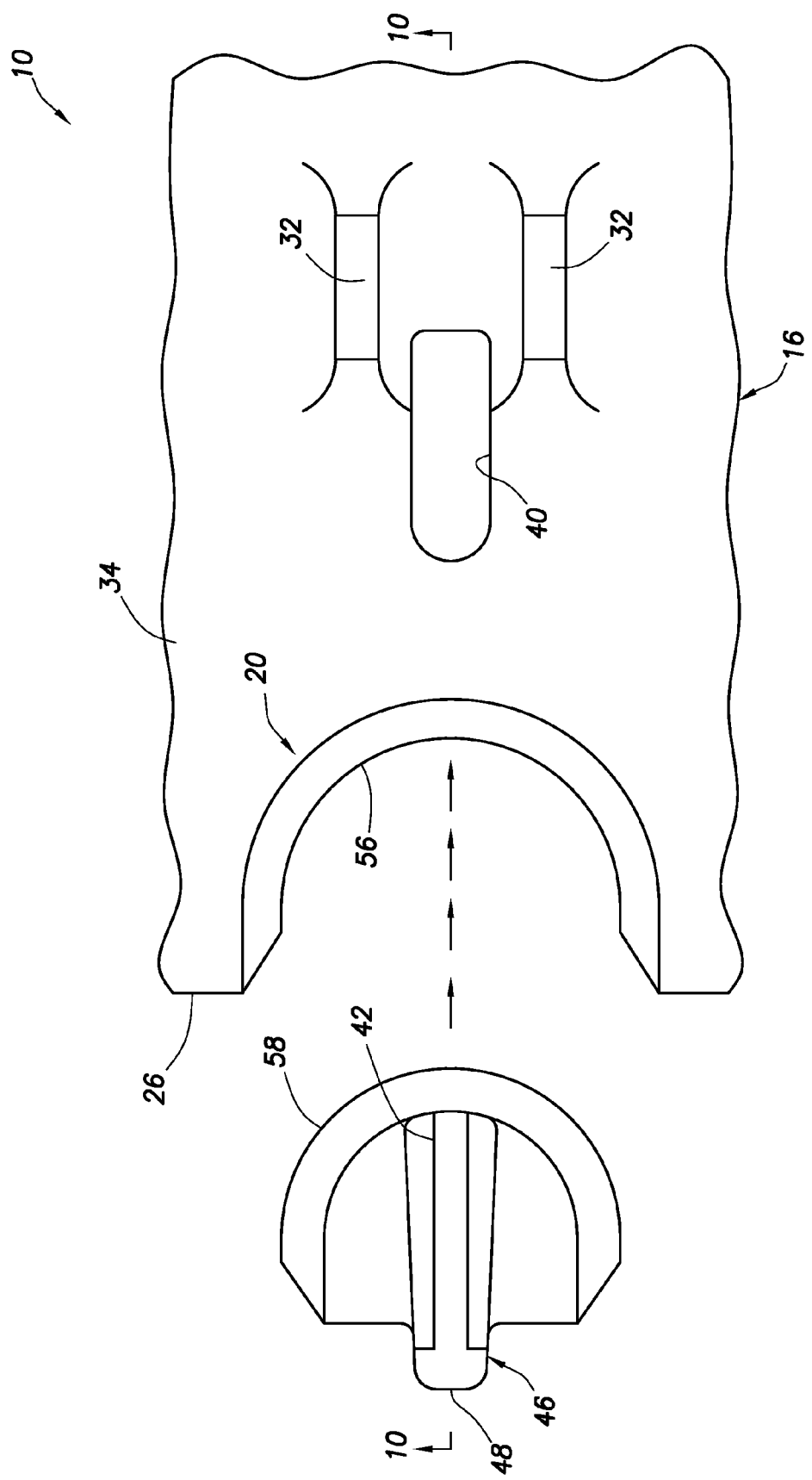

Referring additionally now to FIGS. 9 & 10, another example of the stabilization system 20 is representatively illustrated. In this example, the depression 56 formed in the forward end 26 of the lip 16 is larger and semi-circular in shape, as compared to the depression in the FIGS. 6-8 example.

In FIG. 9, a plan view of the system 20 is representatively illustrated. In this view, it may be seen that the stabilization member 46 includes a generally semi-circular portion 58 that will form part of the forward end 26 of the lip 16 when the stabilization member is attached.

In FIG. 10, a cross-sectional view of the system 20 is representatively illustrated, taken along line 10-10 of FIG. 9. In the FIG. 10 position, the stabilization member 46 is ready to be welded to the inner and outer sides 34, 36 of the lip 16, and about the depression 56 at the forward end 26 of the lip.

Referring additionally now to FIGS. 11 & 12, yet another example of the stabilization system 20 is representatively illustrated. In this example, the stabilization abutments 42 are formed as separate members, which are attached to the respective inner and outer sides 34, 36 of the lip 16 between the pads 62.

In FIG. 11, a plan view of the system 20 is representatively illustrated. In this view, it may be seen that the stabilization abutments 42 are positioned on the inner and outer sides 34, 36 (only the inner side being visible in FIG. 11) rearward somewhat from the forward end 26 of the lip 16.

A conventional protrusion 60 on the forward end 26 of the lip 16 can remain in this example of the stabilization system 20. In the other examples described above (FIGS. 2-10), the protrusion 60 can be removed prior to attaching the stabilization member 46. In the FIGS. 11 & 12 example, removal of the protrusion 60 is not necessary.

In FIG. 12, a cross-sectional view of the system 20 is representatively illustrated, taken along line 12-12 of FIG. 11. In the FIG. 12 position, the stabilization abutments 42 are ready to be welded to the inner and outer sides 34, 36 of the lip 16 adjacent the forward end 26 of the lip.

When the adaptor 14 or other wear member (such as, the tooth 12 or shroud 18) is installed onto the lip 16 having the stabilization abutments 42 secured thereto, engagement between the abutments and the recesses 44 in the wear member will substantially prevent lateral movement of the wear member relative to the lip. In the FIGS. 2-10 examples, engagement between the projection 48 and the space 50 in the wear member will further act to prevent lateral movement of the wear member relative to the lip 16. In the FIGS. 11-12 examples, engagement between the protrusion 60 and the space 50 may allow somewhat more lateral movement, but the abutments 42 will still substantially prevent lateral movement of the wear member relative to the lip 16, and removal of the protrusion 60 is not needed in this example.

A wear member stabilization system 20 for use with an excavation implement 10 is provided to the art by the above disclosure. In one example, the system 20 can include a wear member 12, 14, 18 having recesses 44 formed therein, the recesses 44 being on opposing sides of an excavator lip 16 receiving slot 30 in the wear member 12, 14, 18. The recesses 44 receive therein respective stabilization abutments 42 which protrude outwardly from respective opposing inner and outer sides 34, 36 of the excavator lip 16.

The stabilization abutments 42 may contact lateral sides 52 of the recesses 44 and thereby limit lateral movement of the wear member 12, 14, 18 relative to the lip 16.

The stabilization abutments 42 can be formed on bifurcated legs of a stabilization member 46 that wraps around a forward end 26 of the lip 16.

The stabilization abutments 42 can be formed on a stabilization member 46 which includes a projection 48 that extends outwardly from a forward end 26 of the lip 16. The projection 48 may be received in a space 50 formed in the wear member 12, 14, 18 at a forward end of the excavator lip receiving slot 30.

The stabilization abutments 42 can be positioned between a forward end 26 of the lip 16 and an opening 40 extending through the lip 16. A portion of the stabilization abutments 42 and/or member 46 may also extend forward of the forward end 26 of the lip 16.

The stabilization abutments 42 can be formed on a stabilization member 46 welded to the forward end 26 of the excavator lip 16.

The stabilization abutments 42 may comprise separate members, the members being welded to the inner and outer sides 34, 36 of the excavator lip 16.

Also provided to the art by the above disclosure is a method of stabilizing a wear member 12, 14, 18 on an excavator lip 16. In one example, the method can comprise: welding stabilization abutments 42 to respective inner and outer sides 34, 36 of the excavator lip 16; sliding the wear member 12, 14, 18 onto the excavator lip 16, thereby engaging the stabilization abutments 42 with respective recesses 44 formed in the wear member 12, 14, 18; the stabilization abutments 42 contacting lateral sides 52 of the recesses 44 between a forward end 26 of the excavator lip 16 and an opening 40 extending through the excavator lip 16, thereby limiting lateral movement of the wear member 12, 14, 18 relative to the excavator lip 16.

The stabilization abutments 42 can be formed on separate stabilization members, and the welding step can include welding the stabilization members to the respective inner and outer sides 34, 36 of the excavator lip 16.

The stabilization abutments 42 can be formed on a stabilization member 46 which includes a projection 48 that extends outwardly from the forward end 26 of the lip 16. The sliding step may include the projection 48 being received in a space 50 formed in the wear member 12, 14, 18 at a forward end of an excavator lip receiving slot 30.

The stabilization abutments 42 may be welded to the lip 16 between the forward end 26 of the lip 16 and the opening 40 extending through the lip 16.

The welding step can include welding the stabilization member 46 to the forward end 26 of the excavator lip 16.

An excavation implement 10 described above can include a ground engaging lip 16 having a forward end 26, opposing inner and outer sides 34, 36, and stabilization abutments 42 on the inner and outer sides 34, 36 adjacent the forward end 26; and a wear member 12, 14, 18 having a slot 30 in which the lip 16 is received, and recesses 44 extending outwardly from the slot 30, the stabilization abutments 42 being received in the respective recesses 44 and contacting lateral sides 52 of the recesses 44, thereby limiting lateral movement of the wear member 12, 14, 18 relative to the forward end 26 of the lip 16.

Although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Although each example described above includes a certain combination of features, it should be understood that it is not necessary for all features of an example to be used. Instead, any of the features described above can be used, without any other particular feature or features also being used.

It should be understood that the various embodiments described herein may be utilized in various orientations, such as inclined, inverted, horizontal, vertical, etc., and in various configurations, without departing from the principles of this disclosure. The embodiments are described merely as examples of useful applications of the principles of the disclosure, which is not limited to any specific details of these embodiments.

The terms "including," "includes," "comprising," "comprises," and similar terms are used in a non-limiting sense in this specification. For example, if a system, method, apparatus, device, etc., is described as "including" a certain feature or element, the system, method, apparatus, device, etc., can include that feature or element, and can also include other features or elements. Similarly, the term "comprises" is considered to mean "comprises, but is not limited to."

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of this disclosure. For example, structures disclosed as being separately formed can, in other examples, be integrally formed and vice versa. Accordingly, the foregoing detailed description is to be clearly understood as being given by way of illustration and example only, the spirit and scope of the invention being limited solely by the appended claims and their equivalents.

What is claimed is:

1. A wear member stabilization system for use with an excavation implement, the system comprising:
    a wear member having recesses formed therein, the recesses being on opposing sides of an excavator lip receiving slot in the wear member, wherein the recesses receive therein respective stabilization abutments which protrude outwardly beyond outermost surfaces of respective opposing inner and outer sides of an excavator lip, and wherein the stabilization abutments are positioned adjacent a forward end of the lip.

2. The system of claim 1, wherein the stabilization abutments contact lateral sides of the recesses and thereby limit lateral movement of the wear member relative to the lip.

3. The system of claim 1, wherein the stabilization abutments are formed on bifurcated legs of a stabilization member that wraps around the forward end of the lip.

4. The system of claim 1, wherein the stabilization abutments are formed on a stabilization member which includes a projection that extends outwardly from the forward end of the lip.

5. The system of claim 4, wherein the projection is received in a space formed in the wear member at a forward end of the excavator lip receiving slot.

6. The system of claim 1, wherein the stabilization abutments are positioned between the forward end of the lip and an opening extending through the lip.

7. The system of claim 1, wherein the stabilization abutments are formed on a stabilization member welded to the forward end of the excavator lip.

8. The system of claim 1, wherein the stabilization abutments comprise separate members, the members being welded to the inner and outer sides of the excavator lip.

9. A method of stabilizing a wear member on an excavator lip, the method comprising:
welding stabilization abutments to respective inner and outer sides of the excavator lip;
sliding the wear member onto the excavator lip, thereby engaging the stabilization abutments with respective recesses formed in the wear member;
the stabilization abutments contacting lateral sides of the recesses between a forward end of the excavator lip and an opening extending through the excavator lip, thereby limiting lateral movement of the wear member relative to the excavator lip.

10. The method of claim 9, wherein the stabilization abutments are formed on separate stabilization members, and wherein the welding step further comprises welding the stabilization members to the respective inner and outer sides of the excavator lip.

11. The method of claim 9, wherein the stabilization abutments are formed on bifurcated legs of a stabilization member that wraps around the forward end of the lip.

12. The method of claim 9, wherein the stabilization abutments are formed on a stabilization member which includes a projection that extends outwardly from the forward end of the lip.

13. The method of claim 12, wherein the sliding step further comprises the projection being received in a space formed in the wear member at a forward end of an excavator lip receiving slot.

14. The method of claim 9, wherein the stabilization abutments are welded to the lip between the forward end of the lip and the opening extending through the lip.

15. The method of claim 9, wherein the stabilization abutments are formed on a stabilization member, and wherein the welding step further comprises welding the stabilization member to the forward end of the excavator lip.

16. An excavation implement, comprising:
a ground engaging lip having a forward end, opposing inner and outer sides, and stabilization abutments protruding outwardly beyond outermost surfaces of the inner and outer sides adjacent the forward end; and
a wear member having a slot in which the lip is received, and recesses extending outwardly from the slot, the stabilization abutments being received in the respective recesses and contacting lateral sides of the recesses, thereby limiting lateral movement of the wear member relative to the forward end of the lip.

17. The excavation implement of claim 16, wherein the stabilization abutments are formed on bifurcated legs of a stabilization member that wraps around the forward end of the lip.

18. The excavation implement of claim 16, wherein the stabilization abutments are formed on a stabilization member which includes a projection that extends outwardly from the forward end of the lip.

19. The excavation implement of claim 18, wherein the projection is received in a space formed in the wear member at a forward end of the slot.

20. The excavation implement of claim 16, wherein the stabilization abutments are positioned between the forward end of the lip and an opening extending through the lip.

21. The excavation implement of claim 16, wherein the stabilization abutments are formed on a stabilization member welded to the forward end of the excavator lip.

22. The excavation implement of claim 16, wherein the stabilization abutments comprise separate members, the members being welded to the inner and outer sides of the excavator lip.

* * * * *